(12) United States Patent
Curtis (10) Patent No.: US 8,033,020 B1
(45) Date of Patent: Oct. 11, 2011

(54) LOCKING A WHEEL FOR ROTATION WITH A SHAFT

(76) Inventor: David C. Curtis, Westfield, WI (US)

( * ) Notice: Subject to any disclaimer, the term of this patent is extended or adjusted under 35 U.S.C. 154(b) by 624 days.

(21) Appl. No.: 11/825,053

(22) Filed: Jul. 3, 2007

Related U.S. Application Data (62) Division of application No. 10/761,648, filed on Jan. 21, 2004, now Pat. No. 7,244,061.

(51) Int. Cl.
*B21D 53/26* (2006.01)

(52) U.S. Cl. .............. 29/894; 29/525.01; 29/525.11

(58) Field of Classification Search .............. 29/894, 29/525.01, 525.02, 525.05, 525.11; 16/45; 74/572.21

See application file for complete search history.

(56) References Cited

U.S. PATENT DOCUMENTS

| | | | | |
|---|---|---|---|---|
| 1,346,867 A | * | 7/1920 | Weibull | 411/393 |
| 1,806,694 A | * | 5/1931 | Markson | 279/77 |
| 2,448,278 A | * | 8/1948 | Ronning | 192/71 |
| 2,597,291 A | * | 5/1952 | Clegg | 366/208 |
| 3,570,175 A | * | 3/1971 | Angier | 446/463 |
| 4,089,611 A | * | 5/1978 | Riegler et al. | 403/358 |
| 5,318,375 A | * | 6/1994 | Entrup et al. | 403/359.5 |
| 2004/0047710 A1 | * | 3/2004 | Lauchner | 411/340 |
| 2009/0133242 A1 | * | 5/2009 | Kramer | 29/525.11 |

* cited by examiner

*Primary Examiner* — David Bryant
*Assistant Examiner* — Ryan J Walters
(74) *Attorney, Agent, or Firm* — Robert L. Marsh (57) ABSTRACT

A marinating machine rotates a drum containing the food to be marinated. The drum is positioned on a pair of rotatable shafts only one of which is drivingly engaged to a motor rotating the drum. The drum is rotated by a drive wheel that is mounted on the rotating shaft. The drive wheel is locked for rotation with the shaft by a set screw in a threaded bore extending into the wheel at an angle with the axis of rotation of the wheel, and with the nearest portion of the bore spaced from the axis of rotation to allow the threads of the set screw to cut into the surface of the rotating shaft.

5 Claims, 7 Drawing Sheets

FIG. 10

LOCKING A WHEEL FOR ROTATION WITH A SHAFT

This is a divisional application of applicant's application filed Jan. 21, 2004 now U.S. Pat. No. 7,224,061 and assigned Ser. No. 10/761,648. The present invention relates to an improved and simplified method of locking a wheel to a shaft so that the two will rotate together.

BACKGROUND OF THE INVENTION

The taste and cooking qualities of red meat, pork, poultry, and fish may all be improved by marinating the products prior to cooking. It is desirable during the marinating process to have the product absorb a significant volume of the liquid in which the product is being marinated to improve the moisture content of the product and impart flavor thereto. When a meat product is immersed in a liquid marinating material and left in refrigerated conditions for a number of hours, the meat will absorb a quantity of liquefied marinating material equal to approximately one and one-half percent of the weight of the meat. On the other hand, where meat, poultry or fish is placed in a drum with liquid marinating material, and a vacuum is drawn within the drum and the drum is thereafter rotated for twenty to forty-five minutes, fish, pork and chicken will absorb up to twenty percent of their weight in marinating material and beef will absorb up to ten percent of its weight in marinating material.

Marinating not only adds flavor to the meat or fish, but improves the cooking qualities thereof. When meat having a greater quantity of liquid therein is cooked, some of the liquid within the meat will convert to steam, causing the meat to be cooked from within and the cooked meat will be more moist and flavorful.

A typical marinating machine includes a drum having a plurality of paddles therein, which extend radially inward from the inner surface of the drum to agitate the meat or fish as the drum is rotated. A vacuum is also drawn within the chamber of the drum and the vacuum and the paddles pull the meat product apart for deeper penetration of the liquid while the drum is being rotated at a speed of between eight and fifteen rpm.

The drum rests on a plurality of wheels that allow the drum to rotate about its axis. At least one of the wheels upon which the drum rests is a drive wheel mounted on a rotating drive shaft for rotation with the shaft.

SUMMARY OF THE INVENTION

Briefly, the present invention is embodied in a marinating machine of the type having first and second parallel axles on which wheels are mounted for receiving a rotatable drum. The first and second axles have first and second axes of rotation and the drum rotated thereon has a third axis of rotation. In accordance with the invention, a plane defined by the axis of the first rotating axle and the axis of the drum intersects a second plane formed by the axis of the second axle and the axis of the drum at an angle of at least one hundred degrees, but preferably not greater than one hundred forty degrees. The first and second axles are therefore spaced a greater distance apart from one another than is the case of the axles on prior art marinating machines. By further separating the axles of rotation, the weight of the drum applies a greater force between the outer surface of the drum and the surface of the wheels that urge the drum to rotate, thereby increasing friction between the surface of the drum and the surface of the drive wheel. As a result of the increased friction between the drive wheel and the drum, only one drive axle is needed to rotate the drum and a complicated drive system for rotating a second drive axle is not required. I have found that it is preferable to drive the axle which applies a vector of force having an upward component adjacent the drum instead of the axle which applies a downward component of force thereto.

In accordance with the invention, each of the drive wheels has a centrally located axial bore through which the rotating drive shaft extends. Each of the drive wheels also has therein a second threaded bore having an axis that is oriented at an angle with respect to the centrally located axial bore of the wheel of approximately forty-five degrees. The axis of the threaded bore is also spaced from the axis of the axial bore a distance such that only the threads of a set screw in the threaded bore will extend into the interior of the axial bore. When the wheel is fitted on the shaft and the set screw is threaded into the second bore, the threads of the set screw will engage the outer surface of the drive shaft and cut into the steel of the drive shaft thereby locking the wheel for rotation with the shaft.

BRIEF DESCRIPTION OF THE DRAWINGS

A better and more complete understanding of the invention will be had after a reading of the following detailed description taken in conjunction with the drawings, wherein.

DETAILED DESCRIPTION OF A PREFERRED EMBODIMENT

Figure 1:
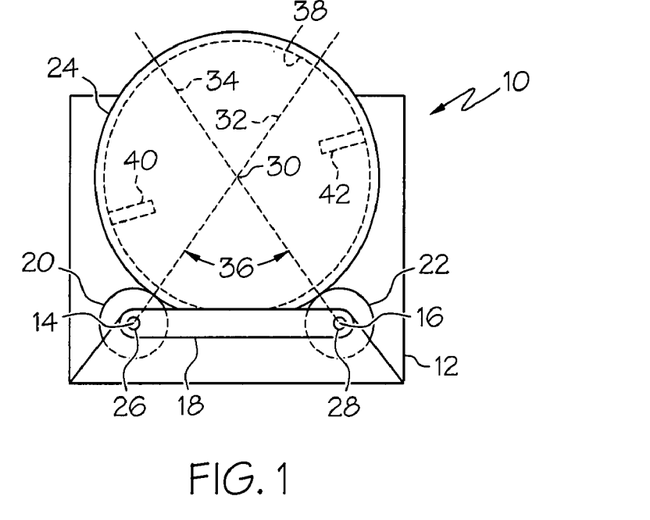
FIG. 1 is an end view of a marinating machine in accordance with the prior art, showing the interior of the drum in broken lines.

Referring to FIG. 1, a prior art marinating machine 10 includes a frame 12 on which is mounted a motor, not shown, for rotatably driving a pair of parallel shafts 26, 28. The shafts 26, 28 are rotated in the same direction and at the same rate of speed by virtue of a drive 18 connecting the first shaft 26 to the second shaft 28. A plurality of drive wheels 20, 22 mounted on the shafts 26, 28 respectively rotate a drum 24 resting thereon. Rotation of the wheels 20, 22 in the clockwise direction as depicted in FIG. 1 causes counter-clockwise rotation of the drum 24.

The shafts 26, 28 have axes 14, 16 respectively and the drum 24 rotates about an axis 30. The shafts 26, 28 are spaced sufficiently far apart to retain the drum 24 thereon while the drum 24 is rotating with food and marinating material therein. On the other hand, it has been deemed desirable that the frame 12 of the machine not be unduly large, and therefore, the shafts 26, 28 of prior art machine 10 are not spaced further apart than necessary to retain the drum 24 thereon. The axis 14 of shaft 26 and axis 30 of drum 24 establish a first plane 32 and axis 28 of shaft 16 and axis 30 of drum 24 establish a second plane 34 which intersect and form an angle 36, which in prior art machines is approximately sixty to ninety degrees.

The drum 24 of the machine 10 has a cylindrical inner surface 38 and projecting radially inward of the inner surface 38 are a plurality of ribs, or paddles 40, 42 which agitate food material within the drum 24 as the drum is rotated by the drive shafts 26, 28 and the drive wheels 20, 22. Where the drum 24 of the prior art machine 10 is made of metal, the paddles 40, 42 are welded or brazed to the inner surface 38 of the drum such that only the planar surfaces on opposite sides of each of the paddles 40, 42 obstruct the cylindrical inner surface 38 of the drum, thereby allowing the parts to be easily cleaned after each use.

Figure 2:
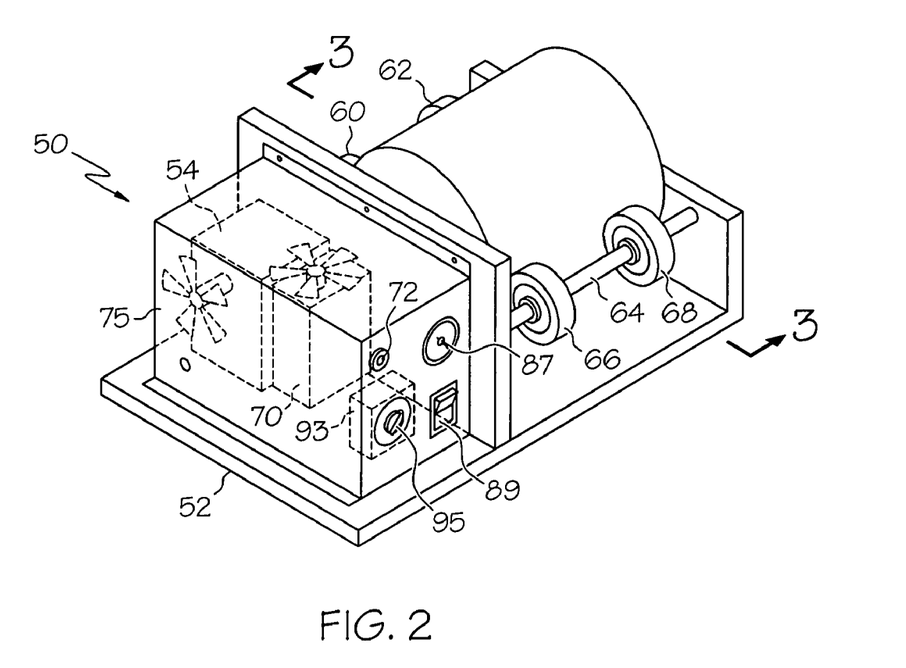
FIG. 2 is an isometric view of a marinating machine in accordance with the present invention.
Figure 3:
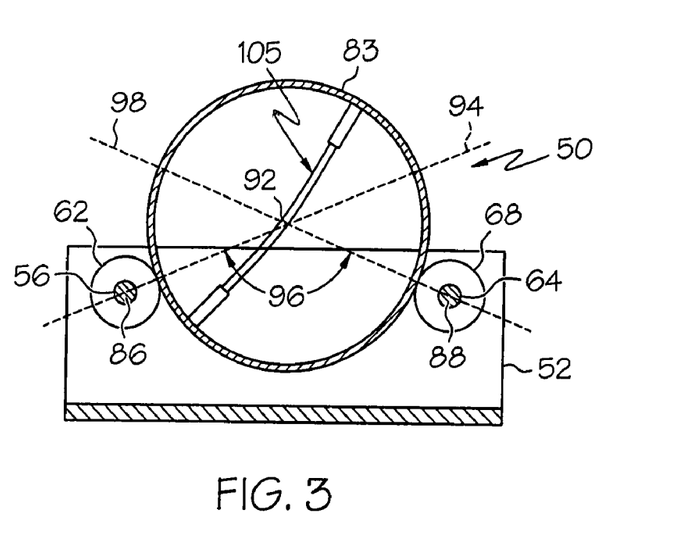
FIG. 3 is a cross-sectional view of the marinating machine shown in FIG. 2 taken through line 3-3 thereof.
Figure 4:
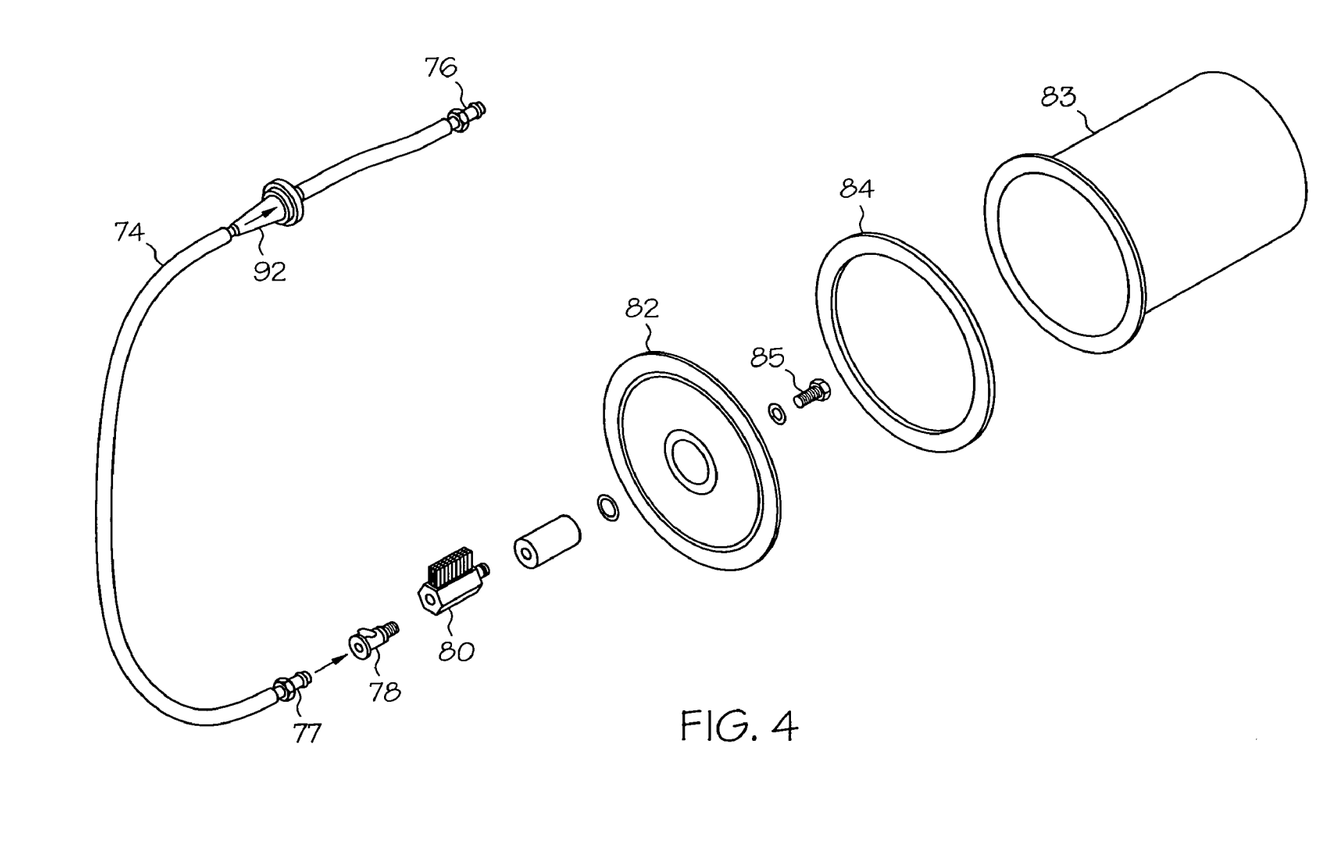
FIG. 4 is an exploded isometric view of the vacuum hose and drum for use with the device of the present invention.

Referring to FIGS. 2, 3, and 4, a marinating machine 50 in accordance with the present invention also has a frame 52 on which is mounted a motor 54 that is drivingly connected through a gear assembly, not shown, to a first shaft 56. Mounted for rotation with the first shaft 56 are a plurality of drive wheels 60, 62. Extending parallel to the first shaft 56 and spaced therefrom is an idler shaft 64 which has mounted thereon a pair of idler wheels 66, 68.

Referring more particularly to FIGS. 2 and 4, the marinating machine 50 further includes a vacuum pump 70 and a port 72 to which a connector is attachable. A length of flexible tubing 74 is provided having a connector 76 at one end thereof suitable for insertion into the port 72. Upon insertion of the connector 76 into the port 72 and energizing the pump 70, a vacuum will be drawn through the tubing 74. A second connector 77 at the opposite end of the tubing 74 is suitable for engaging a second port 78 on a ball valve 80. The second port 78 and the ball valve 80 are retained to the cover plate 82 of a drum 83 by a retainer bolt 85 having an axial bore, not shown, through the length thereof such that the vacuum pump 70 can communicate through the tubing 74, the valve 80 and the bolt 85 with the interior of the drum 83. A rubber gasket 84 is sized to fit around the perimeter of the cover 82 and the inner opening of the drum 83. The valve 80 will retain a vacuum within the drum 83 after the connector 77 is removed from the second part 78. The valve 80 also includes a manually operable release for venting the interior of the drum and thereby releasing any vacuum drawn therein.

A housing 75 encloses the motor 54, the pump 70, and a timing device 93 for measuring an interval of time that the drum 83 will rotate. The amount of time to be measured by the timing device 93 is set by rotating a dial 95 on the outer surface of the housing 75. An operator will manually rotate the dial 95 to set the desired time that the motor 54 is to operate. The rotation of the indicator on the dial 95 away from the "zero" position printed on the dial closes a switch, not shown, that directs power to the motor 54. The motor 54 will continue to run until the time set on the dial 95 has elapsed and the indicator is rotated to the "zero" position. When the indicator reaches the "zero" position, the switch directing power to the motor 54 is again opened thereby turning off the motor 54. A second switch 89 on the housing 75 connects and disconnects power to the pump 70 for turning the pump 70 on or off. A vacuum gauge 87 displays the vacuum level being drawn within the drum 83.

Marinating material is inserted into the drum 83 and the cover 82 and gasket 84 are assembled over the open end thereof, with the connectors 76, 77 of the length of tubing 74 connected to the ports 72, 78 on the vacuum pump 70 and on the cover 82. When the switch 89 is operated to energize the pump 70, it will draw air from within the drum 83 and form a vacuum therein until the desired vacuum is reached as shown on the gauge 87. Thereafter, the switch 89 can be opened and power to the pump 70 terminated. The connector 76 can then be withdrawn from the port 78 and the valve 80 will seal the interior of the drum 83 against leakage until the valve 80 is manually opened. A filter 92 in the tube 74 removes impurities in the air withdrawn by the vacuum pump 70.

Referring to FIG. 3, the drive shaft 56 has a longitudinal axis 86 and the idler shaft 64 has a central longitudinal axis 88, and the drum 83 has a central longitudinal axis 92. A plane 94 defined by axis 86 of the drive shaft 56 and axis 92 of the drum 83 forms an angle 96 with a second plane 98 defined by axis 88 of idler shaft 64 and axis 92 of the drum 83 that, in accordance with the present invention, is at least one hundred degrees, but in no event more than one hundred and forty degrees. Preferably, the angle 96 is about one hundred and twenty degrees. As a result, the drive shaft 56 and idler shaft 64 are spaced further apart than the parallel drive shafts 14, 16 of the prior art machine 10.

Figure 1A:
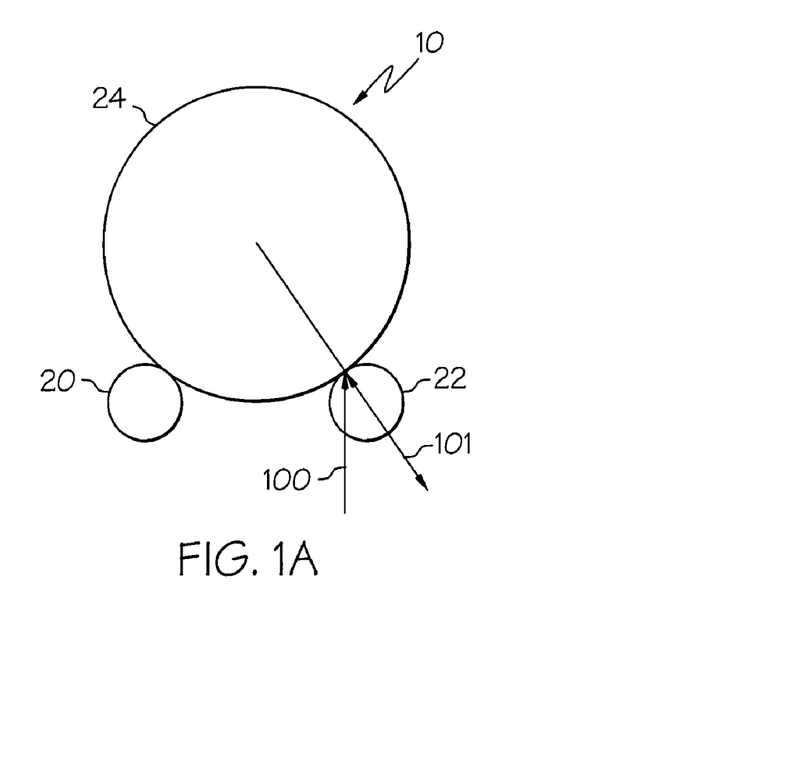
FIG. 1A is a schematic view of the drum and supporting wheels of a machine in accordance with the prior art showing the vector of force applied to the supporting wheels.
Figure 3A:
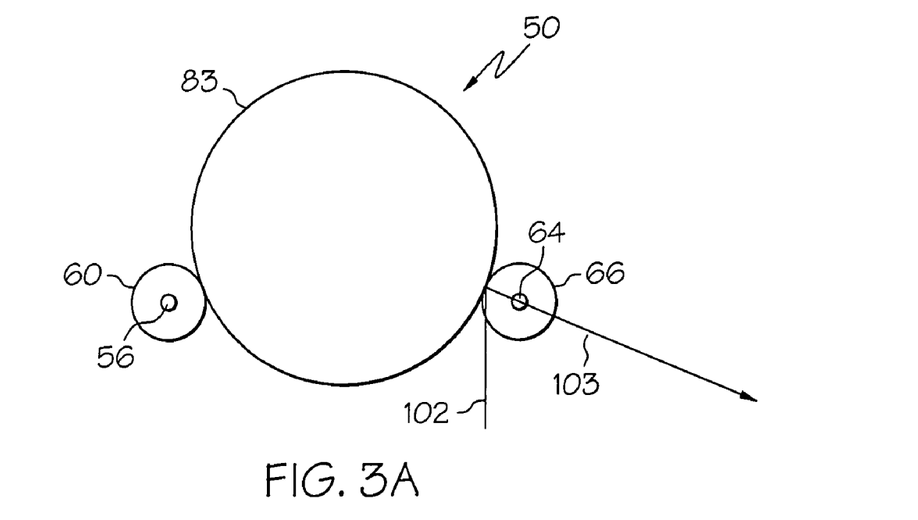
FIG. 3A is a schematic view of the drum and supporting wheels of the machine of the present invention showing the vector of force applied to the supporting wheels.

Referring to FIG. 1A, the drum 24 of the prior art device applies a downward weight 100 to the wheels 20, 22 supporting the drum. The drum 24 therefore applies a vector of force, shown as vector 101, to the surface of one of the wheels 22. Referring now to FIG. 3A, the drum 83 of a machine 50 in accordance with the invention has a downward weight vector 102 that is substantially identical to the weight of vector 100 of the machine 10. Since wheels 60, 62 of the machine 50 are spaced further apart from wheels 66, 68 than the wheels 20, 22 of the machine 10, the drum 83 applies a vector of force 103 against the surface of the wheels 60, 62, 22, 68 that is much greater than the vector of force 101 of the device of the prior art. By virtue of the stronger force applied against the drive wheels 60, 62 the drive wheels 60, 62 have greater friction against the outer surface of the drum 83. Accordingly the drum 83 can be rotated by providing power to only the drive shaft 56 and without providing power to the idler shaft 64. When the wheels 60, 62 on shaft 56 rotate in the clockwise direction as depicted in FIG. 3A, the drum 83 will rotate in the counter-clockwise direction, and the expensive-to-manufacture drive 18 which connects the driveshafts 14, 16 of the prior art machine 10 is not needed.

Figure 5:
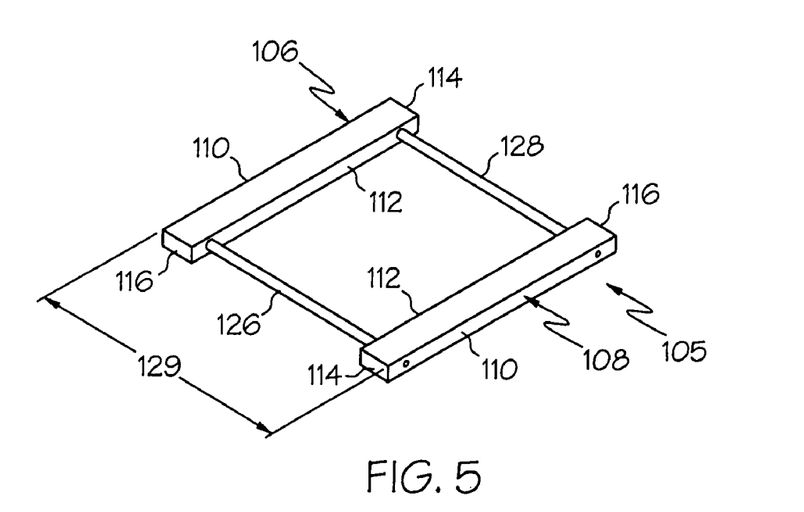
FIG. 5 is an enlarged isometric view of a paddle assembly for use in the marinating machine shown in FIG. 2.
Figure 6:
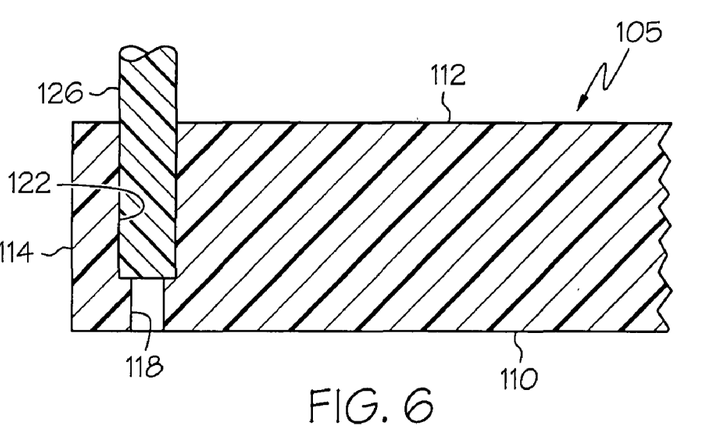
FIG. 6 is a further enlarged fragmentary cross-sectional view of the paddle assembly shown in FIG. 5.

Referring to FIGS. 3, 5, and 6, within the interior of the drum 83 is a paddle assembly 105 consisting of a pair of paddles 106, 108 made of a suitable material that will not effect the food being marinated by the machine 50. Preferably, the paddles 106, 108 are made of nylon or other relatively rigid plastic-type material. Each of the paddles 106, 108 are identical to one another and have a long outer side 110 and a long inner side 112, the lengths of which are a little shorter than the interior length of the drum 83. The paddles 106, 108 also have short sides 114, 116 such that the long sides 110, 112 are spaced apart from each other a distance which provides the desired drop for food material being marinated within the interior of the drum 83.

As best shown in FIG. 6, near each of the short sides 114, 116 and parallel thereto is a bore 118 extending through the ends of the paddles 106, 108 respectively, one of which is depicted. The bore 118 includes a counter bore 122.

The paddles 105 further include a pair of elongate, somewhat flexible cylindrical nylon pins or rods 126, 128. The nylon rods 126, 128 have diameters which are a little smaller than the counter bores 122 of the paddles 106, 108. The paddle assembly 105 is formed by inserting one end of each of the nylon rods 126, 128 into one of the counter bores 122 of a first paddle 106 and the opposite end of the nylon rods 126, 128 into the counter bores 122 of the second paddle 108 as shown in FIGS. 5 and 6. When assembled, the long outer side 110 of paddle 106 is spaced from the long outer side 110 of paddle 108 a distance 129 which is a little larger than the inner diameter of the drum 83. Accordingly, to insert the paddle assembly 105 within the cylindrical inner interior of the drum 83, the nylon rods 126, 128 must be partially bent. Once the assembly 105 is inserted into the interior of the drum 83, the memory qualities of the nylon rods 126, 128 will urge the outer sides 110 of paddle 108 and outer side 110 of paddle 106 radially outwardly and cause friction between the outer sides 110 of the paddles and the inner surface of the drum 83. The friction between these surfaces will cause the paddle assembly 105 to rotate with the drum 83 as the drum is rotated on the wheels 60, 62, 66, 68 of the first and second shafts 56, 64.

After each use of the marinating machine 50, the valve 80 is opened allowing air to enter into the drum 83 and breaking the seal of the gasket 84 such that the cover 82 can be removed from the drum 83. Once the food products are removed from the drum 83, the paddle assembly 105 can be removed and the smooth cylindrical interior of the drum 83 cleaned. To clean the paddle assembly 105, the nylon rods 126, 128 are pulled out of the various counter bores 122 and all of the parts, including the two paddles 106, 108 and the nylon rods 126, 128 can be washed. Since the bores 118 extend through the entire width of the paddles 106, 108 the interiors of the bores can be easily washed with a small, cylindrical brush.

Figure 7:
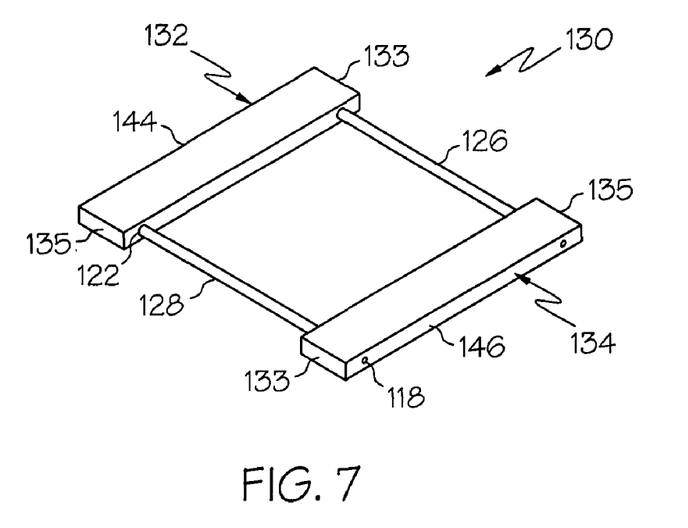
FIG. 7 is an isometric view of a second paddle assembly for use with the marinating machine shown in FIG. 2.

Referring to FIG. 7 in accordance with another feature of the invention, a second paddle assembly 130 consisting of a pair of paddles 132, 134 may be provided for use with the nylon rods 126, 128. Each of the paddles 132, 134 has bores therein with counter bores for receiving the nylon rods as described with respect to the assembly 105 above. The counter bores are sufficiently deep such that when the nylon rods 126, 128 are assembled thereto forming the new paddle assembly 130, the distance between the outer sides 144, 146 of the assembly is again a little larger than the inner diameter of the drum 83 such that the spring qualities of the nylon rods 126, 128 will retain the outer sides 144, 146 of the paddles 132, 134 against the inner surface of the drum 83 as described above. Paddle assembly 130 differs from paddle assembly 105 in that the short sides, 133, 135 of the paddles 132, 134 of assembly 130 are longer than the short sides 114, 116 of the paddles 106, 108 of assembly 105 such that the paddles 132, 134 of assembly 130 have greater surface area than the paddles 106, 108 of assembly 105. The greater surface area of the paddles of assembly 130 allow the paddle to lift the product higher in the drum 83 as the drum is rotated, thereby causing greater separation of the product and greater penetration of marinating material. The product in a marinating machine is pulled apart by the vacuum within the drum and by the agitation of the paddles.

Figure 8:
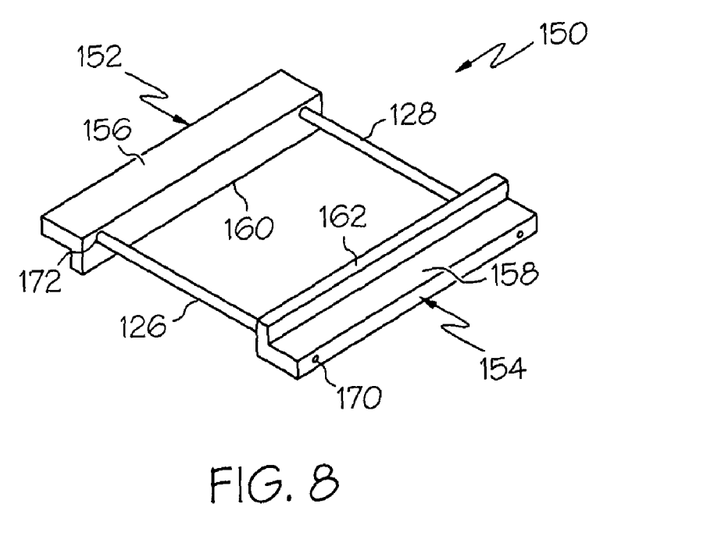
FIG. 8 is an isometric view of a third paddle assembly for use with the machine shown in FIG. 2.
Figure 9:
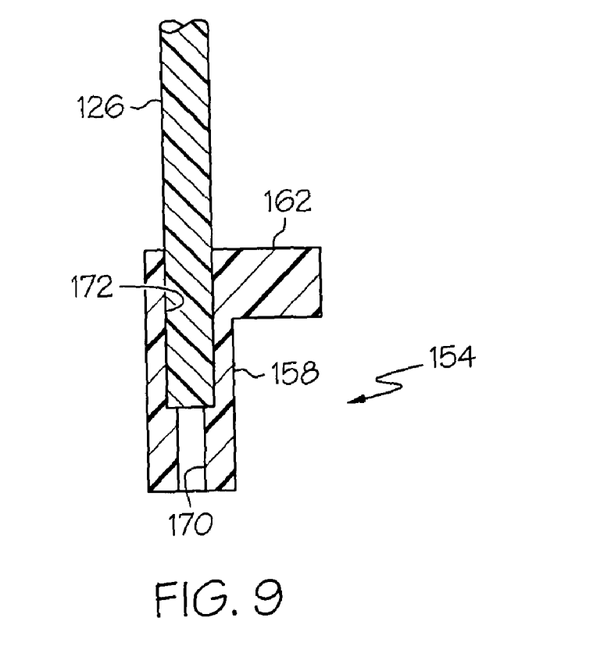
FIG. 9 is a fragmentary cross-sectional view of the paddle assembly shown in FIG. 8.

Referring to FIGS. 8 and 9, another paddle assembly 150 is depicted consisting of paddles 152, 154 each of which consists of a planar portion 156, 158 respectively, and at the inner edge of each of the planar portions 156, 158, a transverse lip 160, 162. The assembly 150 is inserted into the drum 83 with both the lips 160, 162 pointing in the direction of rotation of the drum 83 such that the transverse lips 160, 162 will further increase the lifting capabilities of the paddles 152, 154.

The paddles 152, 154 are preferably constructed of a relatively rigid material such as nylon and have through bores 170 and counter bores 172 as described with respect to the paddles 106, 108 above for the receiving of flexible rods 126, 128. The counter bores 172 may be made to a depth such that the same set of rods 126, 128 may be used to assemble any one of the paddles assemblies 105, 130, 150, thereby minimizing the cost of manufacture.

Figure 10:
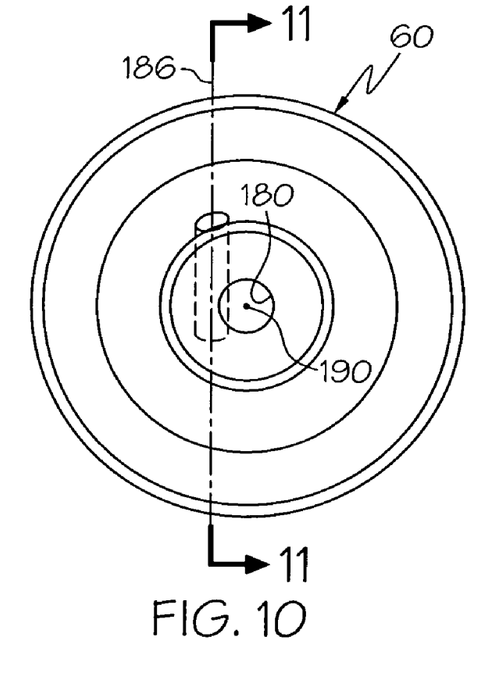
FIG. 10 is a front elevational view of one of the drive wheels for rotating the drum of the machine shown in FIG. 2.
Figure 11:
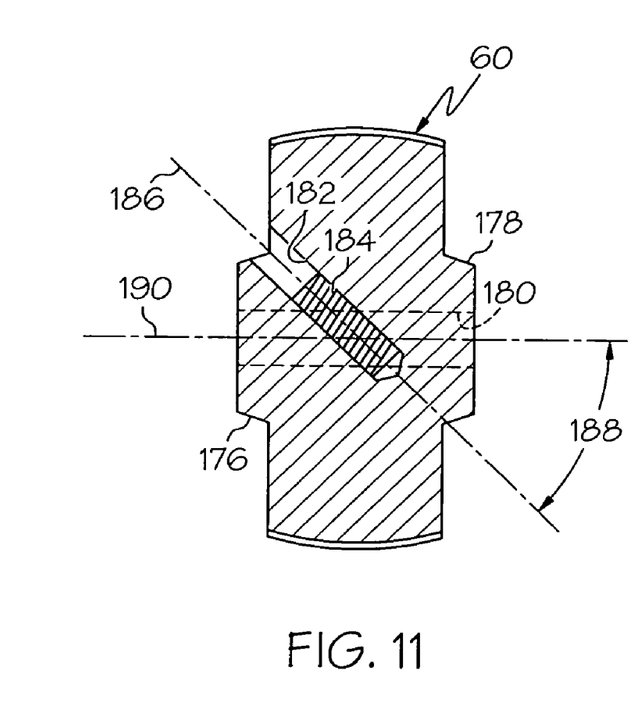
FIG. 11 is a cross-sectional view of the wheel shown in FIG. 10 taken through line 11-11 thereof.

Referring to FIGS. 10 and 11, the present invention is the method by which each of the drive wheels 60, 62, only one of which, 60, is depicted, is drivingly attached to the drive shaft 56. Wheel 60 has central protrusions or hubs 176, 178 on each side thereof, and an axial bore 180 sized to slideably receive the drive shaft 56. Extending through the body of the wheel 60 is a second threaded bore 182 into which is threaded a metal set screw 184. The second bore 182 has an axis 186 that is oriented at an angle 188 with respect to the axis 190 of the wheel 60 of approximately forty-five degrees. The axis 186 of the threaded bore 182 is also spaced from the axis 190 of axial bore 180 a distance such that only the threads of the set screw 184 will extend into the interior of the bore 180. When the wheel is fitted on the shaft and the set screw 184 is threaded into the bore 182, the threads of the set screw 184 will engage the outer surface of the drive shaft 56 and cut into the steel of the drive shaft 56 thereby locking the wheel 60 to the shaft 56.

It should be appreciated that it is desirable for the threads of the set screw 184 to contact the shaft 56 midway along the axial length of the axial bore 180 to prevent the wheel 60 from wobbling on the shaft 56. It should also be appreciated that the threaded bore 182 may be at an angle 188 greatly different than forty-five degrees. Also, the set screw 184 must be made of a harder steel than the drive shaft 56.

While the present invention has been described with respect to a single embodiment, it will be appreciated that many modifications and variations may be made without departing from the true spirit and scope of the invention. It is therefore the intent of the appended claims to cover all such modifications and variations which fall within the true spirit and scope of the invention.

What is claimed:

1. The method of attaching a wheel to a shaft for rotation therewith wherein said wheel has an axial bore of a given diameter, said axial bore having a longitudinal axis and an inner wall, said shaft having a diameter substantially equal in diameter to said given diameter, said method comprising
   providing a second bore in said wheel, said second bore having a second longitudinal axis that is not parallel to said longitudinal axis of said axial bore and is spaced from said longitudinal axis of said axial bore, said second bore having an inner wall that intersects said inner wall of said axial bore,
   providing threadings in said inner wall of said second bore,
   providing a stud having a threading complementary to said threading in said inner wall of said second bore, and
   screwing said stud into said threads of said second bore until said threads of said stud contact said outer surface of said shaft wherein said wheel is locked for rotation with said shaft.

2. The method of claim 1 wherein said stud threaded into said second bore has a hardness that is harder than a hardness of said shaft.

3. The method of claim 1 wherein said longitudinal axis of said second bore does not intersect said inner wall of said axial bore.

4. The method of attaching, a wheel to a shaft for rotation therewith wherein said wheel has an axial bore of a given diameter, said axial hole having a longitudinal axis and an inner wall, said shaft having a diameter substantially equal in diameter to said given diameter, said method comprising providing a second hole in said wheel, said second hole having a second longitudinal axis that is not parallel to said longitudinal axis of said axial hole, providing threadings in said inner wall of said second hole, providing a stud having a threading complementary to said threading in said inner wall of said second hole, said longitudinal axis of said second hole spaced from said longitudinal axis of said axial hole wherein only said thread's of said stud extend into an interior of said axial hole, and screwing said stud into said threads of said second hole until said threads of said stud contact said outer surface of said shaft wherein said wheel is locked for rotation with said shaft.

5. The method of claim 4 wherein said threads on said stud cut into the surface of said shaft in said axial hole.

* * * * *